United States Patent [19]

Mizokami et al.

[11] Patent Number: 5,448,543
[45] Date of Patent: Sep. 5, 1995

[54] APPARATUS FOR REPRODUCING DATA FROM A REGENERATIVE SIGNAL USING A PLH CIRCUIT HAVING LOOP GAIN CONTROL

[75] Inventors: Takuya Mizokami, Odawara; Noritaka Narita; Akira Takagishi, both of Fujisawa; Masahiro Takasago, Odawara; Toru Kawashima, Chigasaki; Masanori Matsuzaki, Chigasaki; Toshiharu Kon, Chigasaki, all of Japan

[73] Assignee: Hitachi, Ltd., Tokyo, Japan

[21] Appl. No.: 937,278

[22] Filed: Aug. 31, 1992

[30] Foreign Application Priority Data

Sep. 3, 1991 [JP] Japan .................. 3-223145

[51] Int. Cl.$^6$ .............................. G11B 7/00
[52] U.S. Cl. ........................ 369/54; 369/48; 369/124; 369/44.32; 375/250
[58] Field of Search ............ 369/48, 54, 59, 51, 369/124; 328/13, 75; 329/325; 331/15-19, DIG. 2; 375/111, 113, 114; 360/51

[56] References Cited

U.S. PATENT DOCUMENTS

| | | | |
|---|---|---|---|
| 4,974,221 | 11/1990 | Hosoya et al. | 369/44.32 |
| 5,065,384 | 11/1991 | Yokogawa | 369/47 |
| 5,088,080 | 2/1992 | Ishibashi et al. | 369/48 X |
| 5,172,357 | 12/1992 | Taguchi | 369/48 |

FOREIGN PATENT DOCUMENTS 1-277371  2/1989  Japan .
2-83862   3/1990  Japan .

Primary Examiner—Aristotelis Psitos
Assistant Examiner—Thang V. Tran
Attorney, Agent, or Firm—Fay, Sharpe, Beall, Fagan, Minnich & McKee

[57] ABSTRACT

A PLL circuit produces a synchronous signal by utilizing a regenerative clock signal in a VFO portion in a regenerative signal which was read out from a recording medium in sections. When a defective portion is present in a regenerative clock signal, the same sector is read out again from the recording medium to obtain the regenerative signal. A loop gain of the PLL circuit is made to be low in the defective portion of the regenerative signal which was read out again, thereby to prevent the synchronous fault of the PLL circuit due to the defective portion.

17 Claims, 8 Drawing Sheets

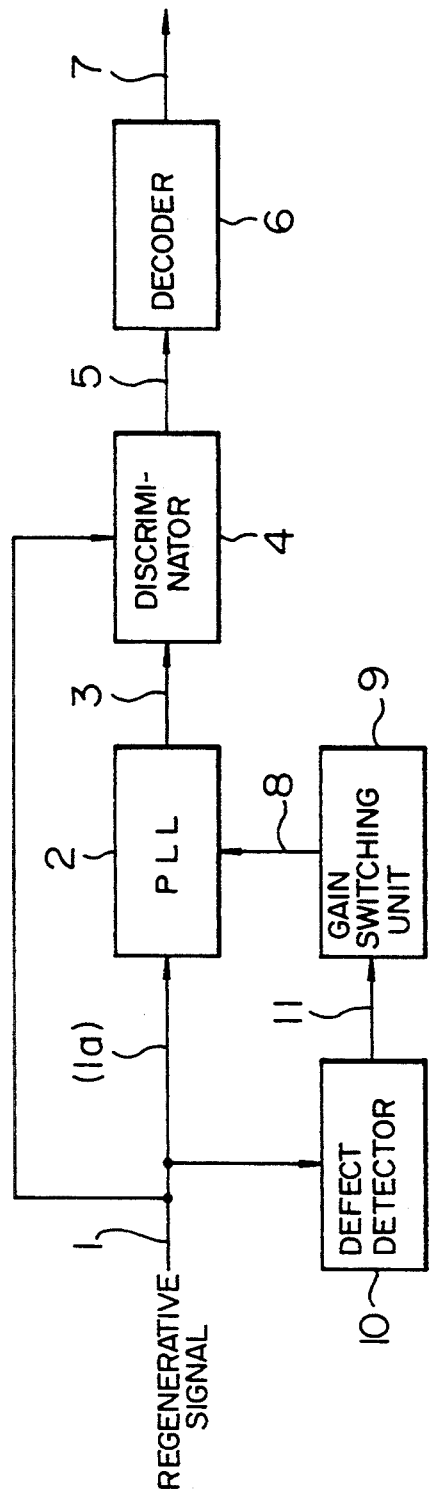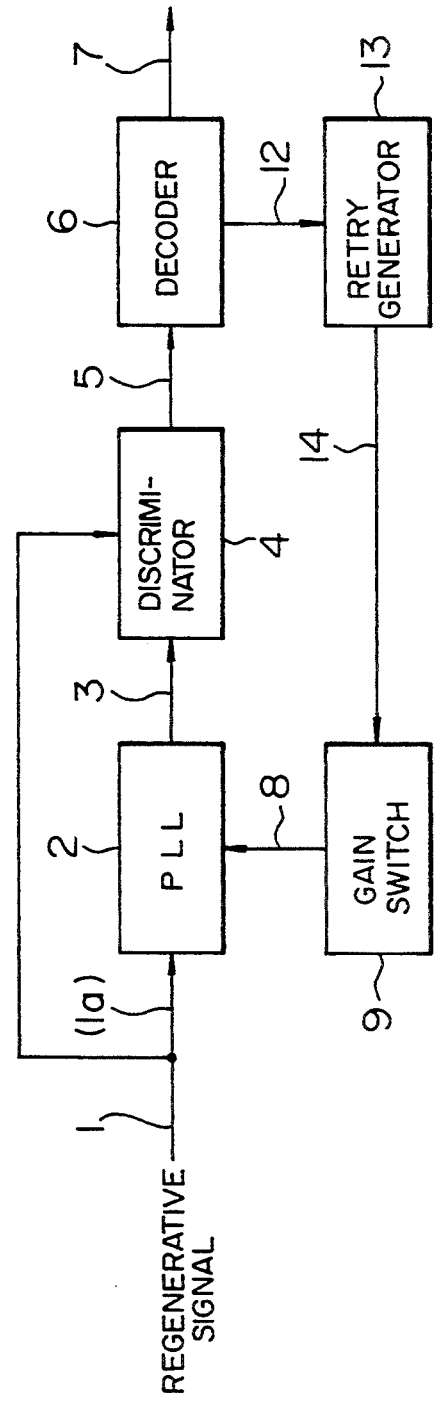

APPARATUS FOR REPRODUCING DATA FROM A REGENERATIVE SIGNAL USING A PLH CIRCUIT HAVING LOOP GAIN CONTROL

BACKGROUND OF THE INVENTION

The present invention relates to a data reproducing apparatus, and more particularly to an apparatus for producing a synchronous signal which is synchronous with record data, when reproducing the record data with external peripheral equipment of a computer such as an optical disc unit, a magnetic disc unit, a magneto-optical disc unit or a magnetic card reader.

In an optical disc unit for example, a synchronous signal is produced using a regenerative clock signal of a VFO portion in a sector read out from an optical disc, and on the basis of the resultant synchronous signal, a PLL circuit is synchronized. In this connection, if dust or the like is stuck to the VFO portion on the optical disc, errors may occur in the synchronous signal so that the synchronous processing of the PLL circuit gets out of order in some cases. In a case where a defective portion is present in the VFO portion due to sticking of the dust or the like, in the prior art apparatus, a retry operation of reading the same portion is repeated to obtain a synchronous signal free from the errors. However, even if the retry is repeatedly performed, it is difficult to produce a synchronous signal free from errors as long as the dust thus stuck is not removed.

Incidentally, the operation of the PLL circuit which is used for such a data reproducing operation is disclosed in JP-A-1-277371 and JP-A-2-83862.

SUMMARY OF THE INVENTION

It is therefore an object of the present invention to provide a data reproducing apparatus which is capable of successful data reproduction during retry with a simple configuration. The present invention is characterized in that a defective portion in the VFO portion of the sector read out is detected. In correspondence with the position of the detected defective portion, a window which is provided in order to fetch a part of a regenerative clock signal of the VFO portion may be moved with respect to the time base. Moreover, a PLL circuit may be switched to a low loop gain in the position of the defective portion detected with the window being fixed.

BRIEF DESCRIPTION OF THE DRAWINGS

FIG. 2 is a block diagram showing one example of a data reproducing apparatus;

FIG. 3 is a block diagram showing another example of a data reproducing apparatus;

DESCRIPTION OF THE PREFERRED EMBODIMENTS

First, a description will be given of a recording format of an optical disc in an optical disc unit to which the present invention is applicable, by referring to FIG. 1.

Figure 1:
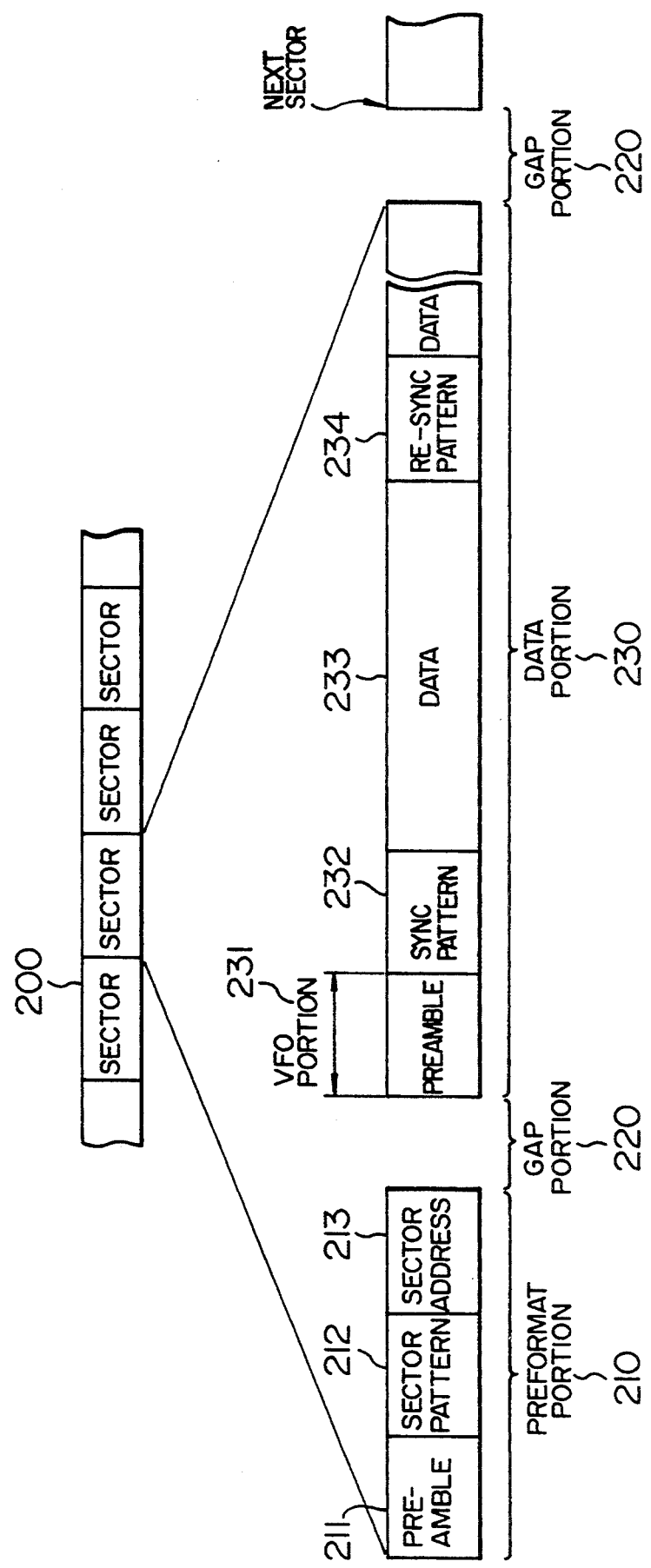
FIG. 1 is a diagram useful in explaining a data recording format of an optical disc unit to which the present invention is applicable.

As shown in FIG. 1, a plurality of sectors are continuously arranged on a certain track. In each sector 200, a preformat portion 210 for representing the start of the sector and the sector address (number) is arranged across a gap portion 220 from a data portion 230. Incidentally, the sectors 200 are separated through the gap portion 220.

The preformat portion 210 includes a preamble portion 211, a sector pattern portion 212 and a sector address portion 213. The data portion 230 includes a variable frequency oscillator (VFO) portion (preamble portion) 231, a SYNC pattern portion 232, a data portion 233, and a plurality of RE-SYNC pattern portions 234 which are arranged in the data portion at regular intervals.

In the VFO portion 231 of the data portion 230 is recorded a bit pattern which is used for the bit synchronization for reading out the data of the sector of interest. A regenerative clock signal for the synchronization of the Phase locked loop (PLL) circuit is obtained from the pattern of the VFO portion.

If dust or the like is stuck to the VFO portion 231 to create a defective portion, a state of silence normally generated by the defective portion so that the clock of the regenerative clock signal is found to be lacking. As a result, there is a possibility that the frequency of the synchronous signal produced in the PLL circuit gets out of order, and the data of the sector of interest cannot be read out properly. Still, similarly, there is a possibility that the defective portion occurs also in the preformat portion 211. However, since the contents of the sector address portion 231 can be estimated, even if the defective portion occurs, this does not become quite such a problem as in the VFO portion 231.

In order to produce the synchronous signal properly in the data reproducing apparatus for the case where the defective portion occurs in the VFO portion in the optical disc unit for example, a configuration as shown in FIG. 2 is considered.

In FIG. 2, numeral 1 designates a data regenerative signal which has been read out from the optical disc and which comes in sections. A PLL circuit 2 produces a synchronous signal 3 synchronous with the record data using a regenerative clock signal 1a in the regenerative signal 1. A discriminator 4 checks to see if the regenerative signal is present in a predetermined time zone using the synchronous signal 3. If so, the discriminator 4 judges the regenerative signal to be normal, thereby to output a detection signal 5. Then, a decoder 6 decodes the detection signal 5 to output a decoded signal 7. When detecting the defective portion of the regenerative clock signal 1a in the VFO portion 231, a defect detector 10 outputs a defect detection signal 11. A gain switching means 9 outputs a gain switching signal 8 to the PLL circuit 2 in correspondence with the defect detection signal 11, thereby to switch the gain of the PLL circuit 2 to the high gain state or the low gain state.

In FIG. 1, during the reproduction of the VFO portion, a switching signal 8 is sent from the gain switching means 9 to the PLL circuit 2, and the cut-off characteristics of a loop filter of the PLL circuit 2 is switched to the wide frequency band. That is, the PLL circuit 2 makes the loop gain high and fetches powerfully the regenerative clock signal 1a of the VFO portion 231. In the reproduction posterior to the VFO portion 231, the cut-off characteristics of the PLL circuit 2 is switched to the narrow frequency band by the gain switching signal 8 from the gain switching circuit 9, thereby to make the loop gain of the PLL circuit 2 low, so as to make the synchronization difficult to get out of order for some disturbances.

If during the reproduction of the VFO portion 231, the defect detector 10 detects a defective portion in the regenerative clock signal 1a, the defect detector 10 sends the defect detection signal 11 to the gain switching means 9. Immediately after receiving the defect detection signal 11, the gain switching means 9 switches the cut-off characteristics of the loop filter of the PLL circuit 2 to the narrow frequency band to make the loop gain low. Thus, during the reproduction of the VFO portion 231, the loop gain of the PLL circuit 2 is made to be low in real time with respect to only the defective portion, whereby it is possible to remove the bad influences of the defective portion. However, in this case, there arises a problem that the operation is delayed.

However, as another data reproducing apparatus, a configuration as shown in FIG. 3 is considered. Incidentally, in FIG. 3, the same reference numerals and symbols as those of FIG. 2 represent the same or like constituent parts.

In FIG. 3, when the decoder 6 cannot decode the data of a certain sector properly, the reproducing operation for the data of the sector of interest is performed again. Hereinafter, this operation will be referred to as "retry", when applicable.

At this time, the decoder 6 sends an error signal 12 to a retry generator 13. Then, the retry generator 13 instructs the gain switching means 9 through a retry information signal 14 to switch the cut-off characteristics of the PLL circuit 2 to the narrower band than that of the normal operation and make the loop gain low in at least one retry.

As a result, it is possible to prevent the fetching malfunction of the PLL circuit 2 due to the defective portion occurred in the VFO portion. However, in this case, there is provided the low gain even in a portion or portions other than the defective portion of the VFO portion 231.

Figure 4:
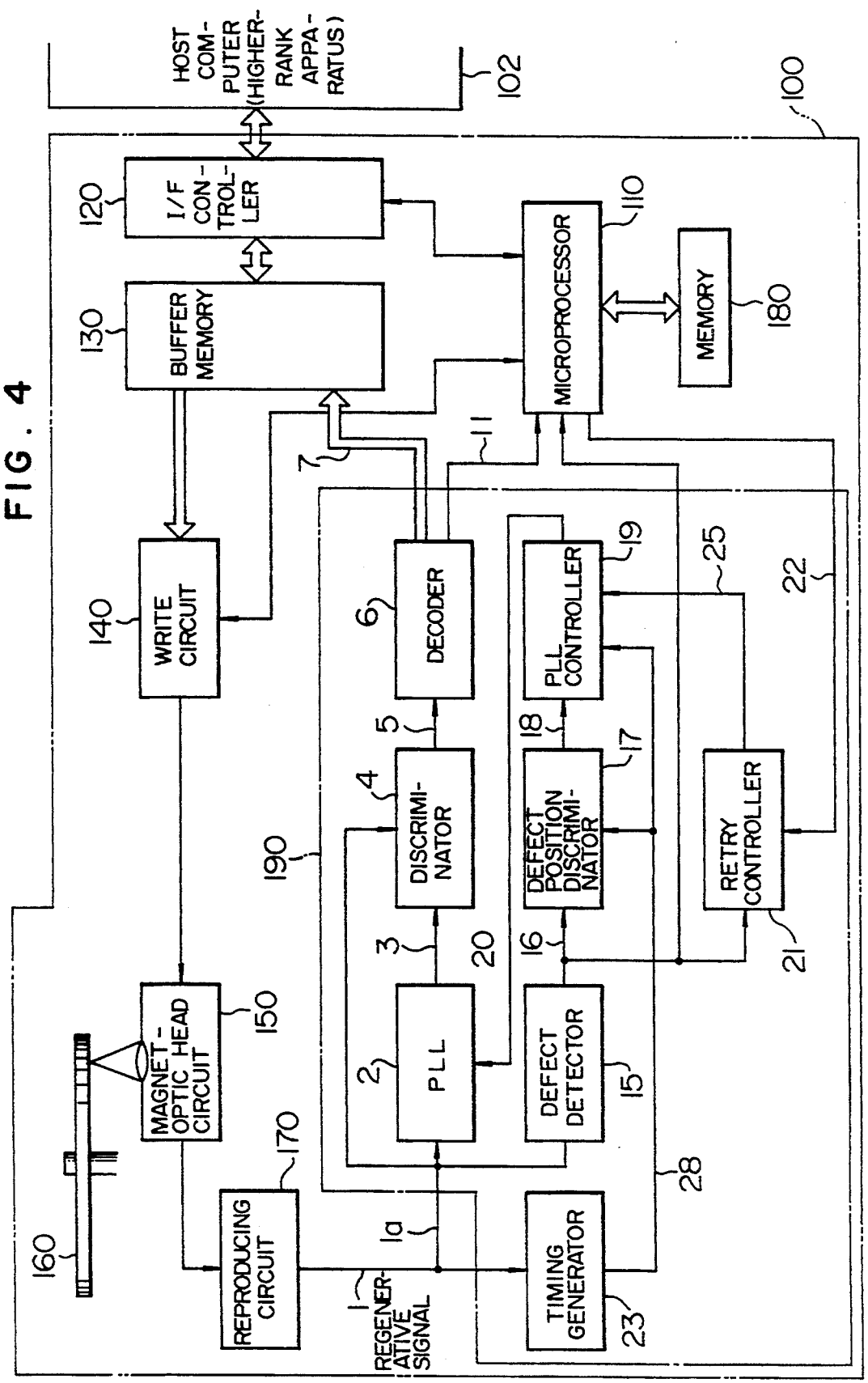
FIG. 4 is a block diagram showing an embodiment of the data reproducing apparatus according to the present invention.

FIG. 4 is a block diagram showing a configuration of a magneto-optic disc unit 100 including a data reproducing apparatus 190 as an embodiment of the present invention.

In the figure, a magneto-optic disc unit 100 is connected through an interface controller 120 to a host computer 102 as a higher-rank apparatus. The data issued from the host computer 102 is applied through the interface controller 120, a buffer memory 130 and a write circuit 140 to the magneto-optic disc unit 150 to be written to a magneto-optic disc 160. The data read out from the magneto-optic disc 160 is sent through a reproducing circuit 170, a data reproducing apparatus 190 of the present invention, the buffer memory 130 and the interface controller 120 to the host computer 102. Still, those operations in the magneto-optic disc unit are managed by a microprocessor 110 using a control memory 180.

In the data reproducing apparatus 190, the data regenerative signal 1 including the regenerative clock signal 1a is read out from the magneto-optic disc 160 having the same format as in FIG. 1. The PLL circuit 2 is designed in such a way that when the gain control signal 20 from the PLL controller 19 is off, the PLL circuit 2 is switched to the narrow band, i.e., the low gain is provided to fetch the regenerative clock signal 1a in the PLL circuit 2. In other words, the PLL circuit 2 performs the fetching operation during the on period of the gain control signal 20 with the loop filter being switched to the wide band, i.e., the high gain.

Moreover, the error signal 11 issued from the decoder 6 is sent to the microcomputer 110. Since other operations of the PLL circuit 2 and the decoder 6 and the operation of the discriminator 4 are the same as those of FIG. 2, the detailed description thereof will be omitted here for the sake of simplicity.

The reference numeral 15 designates a defect detector for detecting a defective portion of the VFO portion 231. The detection of the defective portion is, for example, performed by judging whether or not the period, i.e., the interval of the regenerative signal 1 is out of a predetermined range.

The reference numeral 17 designates a defect position discriminator for receiving a defect detection signal 16 from the defect detector 15 to discriminate the position of the defect in the VFO portion 231. The reference numeral 19 designates a PLL controller which is turned on only in a window of the specified time (To in FIG. 6) in the VFO portion 231 to output a control signal 20 used for switching the PLL circuit 2 to the wide band and the high gain.

The reference numeral 21 designates a retry controller which outputs, in response to a retry instruction signal 22 from the microprocessor 110, a retry control signal 25 used for controlling a gain control signal 20 during the retry. The reference numeral 23 designates a timing generator which supplies a timing signal required for the operations of the defect position discriminator 17 and the PLL controller 19 that is synchronized with the regenerative signal 1.

The microprocessor 110 outputs the retry instruction signal 22 to the retry controller 21 on the basis of the defect detection signal 16 and the error contents of the decoded signal 7 obtained from the error signal 11.

Figure 5:
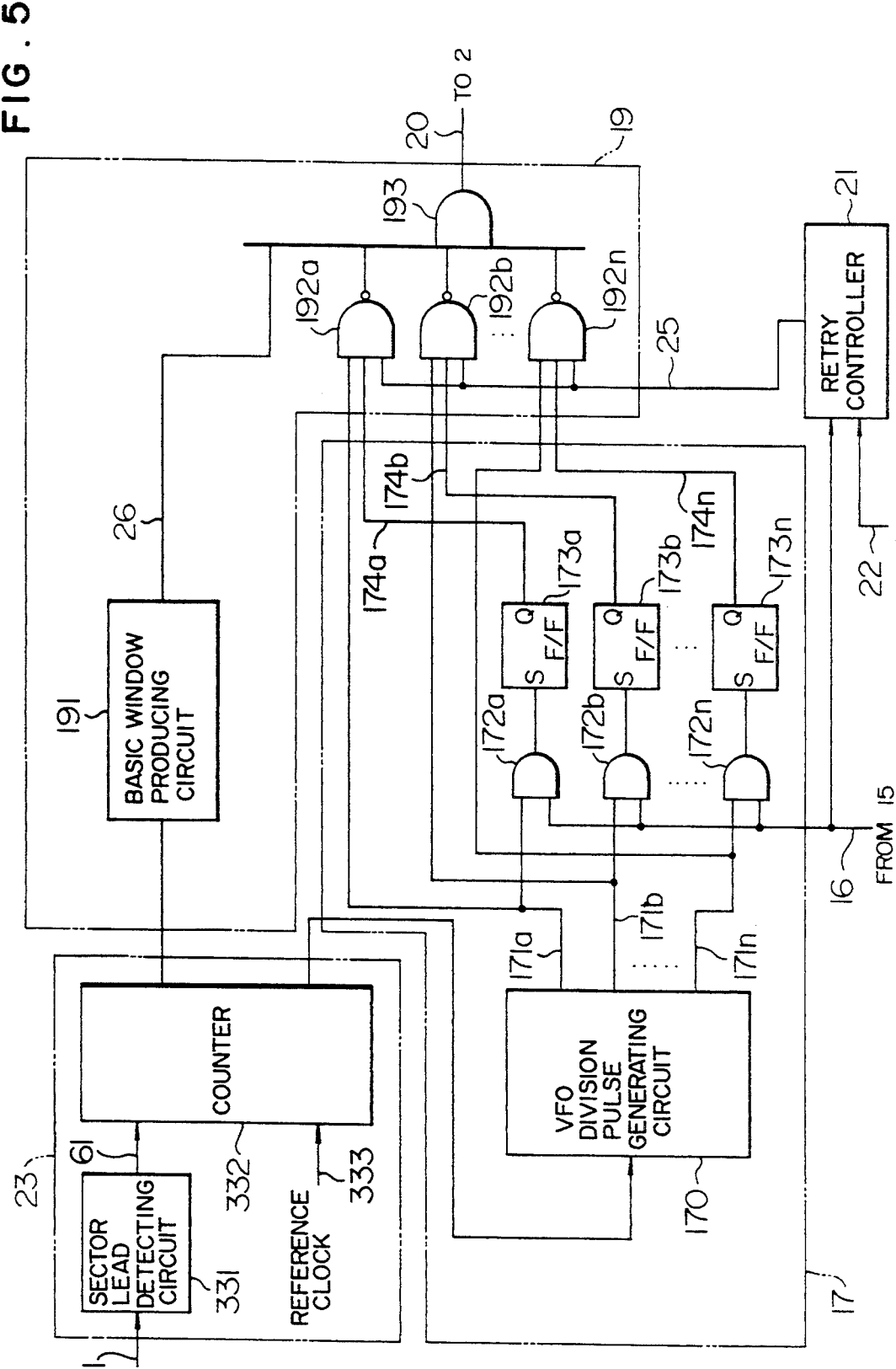
FIG. 5 is a block diagram showing an example of a configuration of a main portion of the embodiment shown in FIG. 4.

FIG. 5 is a block diagram showing exemplary configurations of the defect position discriminator 17, the PLL controller 19 and the timing generator 23 shown in FIG. 4.

In the figure, the timing generator 23 includes a sector leader detecting circuit 331 which receives the regenerative signal 1 to output a start pulse 61 for representing the leader of the sector, and a counter 332 which starts the counting with a system clock of the external peripheral equipment as the reference clock, in response to a sector pulse 61. Incidentally, the pulse for the counter 332 is not limited to the system clock. That is, the pulse may be supplied from an independent reference clock pulse generator.

The defect position discriminator 17 includes a VFO division pulse generating circuit 170, a plurality of twoinput AND gates 172a to 172n, and a plurality of flip flops 173a to 173n.

The PLL controller 19 includes a basic window producing circuit 191 for producing a window W for the basic reproduction on the basis of the two counting outputs of the counter 332, a plurality of multi-input NAND gates 192a to 192n, and a multi-input AND gate 193 to which the output of the basic window producing circuit 191 and the outputs of the NAND gates 192a to 192n are connected. In this connection, one inputs of the multi-input NAND gates 192a to 192n are connected to the respective outputs of the VFO division pulse generating circuit 170, the other inputs thereof are connected to the respective flip flops 173a to 173n, and the remaining inputs thereof are connected to the retry controller 21.

The operation of the embodiment of the present invention will hereinafter be described with reference to FIGS. 4 to 7.

Figure 6:
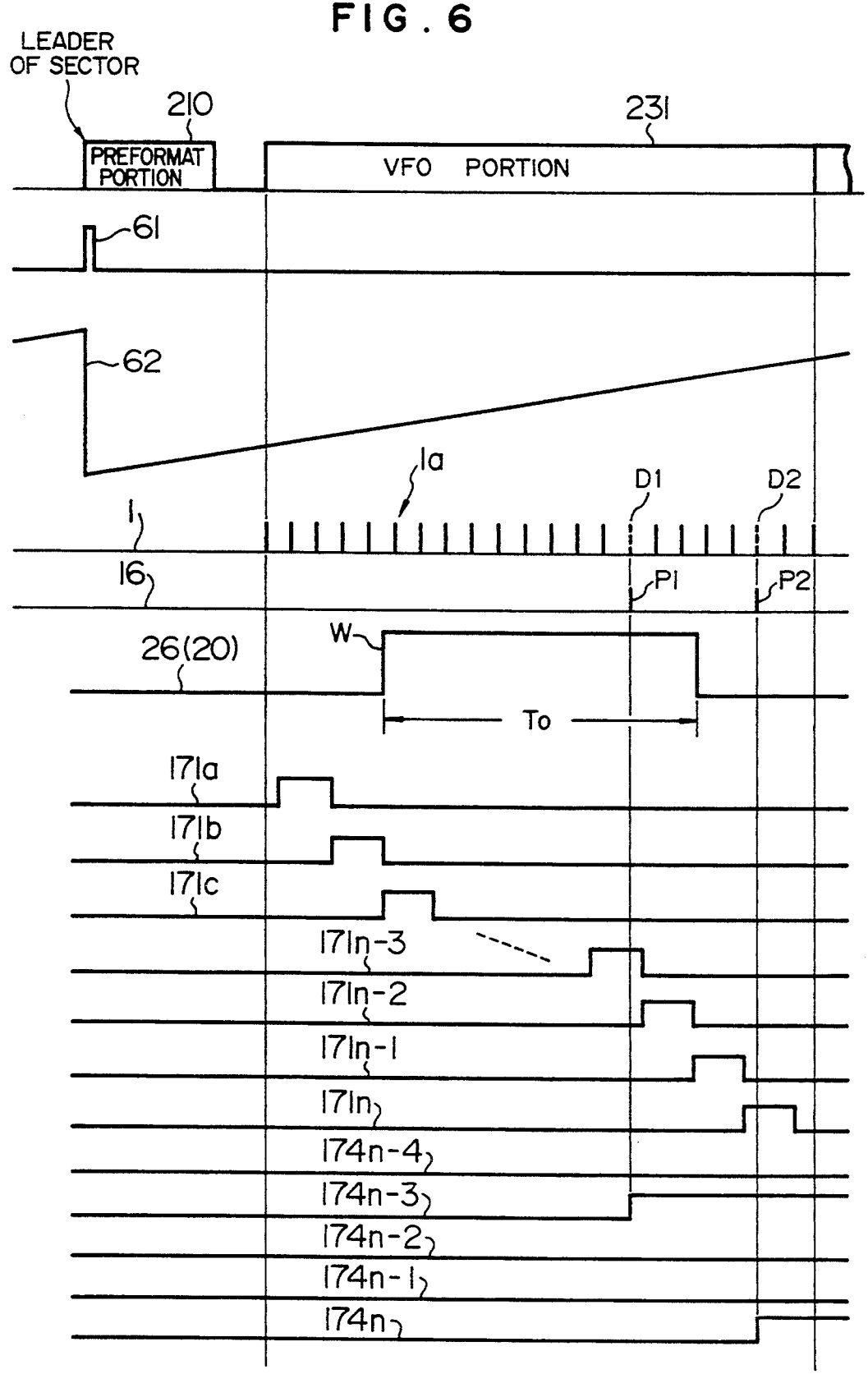
FIG. 6 is a timing chart showing waveforms of sections occurring in the detection of a position of a defect in the embodiment shown in FIG. 4.

When the sector leader detecting circuit 331 in the timing generator 23 detects the leader of the sector on the basis of the incoming regenerative signal 1, the circuit 331 outputs the count start pulse 61 shown in FIG. 6. Then, the counter 332 receives the count start pulse 61 to start counting the system clock designated by the reference numeral 62 of FIG. 6. The height of the waveform 62 represents the count value.

After the VFO portion 231, in correspondence to the count value of the counter 332, the circuit for producing a window for basic reproduction 191 produces the window W of the pulse 26 of FIG. 6. In the initial reproduction of the regenerative signal 1, the waveform 26 of FIG. 6 passes through the AND gate 193 directly to be outputted therefrom as the gain control signal 20. As a result, the PLL circuit 2 makes the loop gain high only during the period of the window W of the waveform 26 to perform the powerful fetching operation.

At the same time, in correspondence with the count value of the counter 332, the VFO division pulse producing circuit 170 produces a plurality of division pulses 171a to 171n which don't superimpose on one another. The VFO portion 231 is divided into predetermined unit areas by the division pulses 171a to 171n.

On the other hand, the defect detector 15 receives the regenerative clock signal 1a in the VFO portion 231 to detect the defective portions D1 and D2 due to the sticking of the dust or the like, thereby to output the defect detection signal 16. The positions of defect pulses P1 and P2 of the defect detection signal 16 correspond to those of the defective portions D1 and D2, respectively. The defect detection signal 16, and the division pulses from the VFO division pulse generating circuit 170 are subjected to the logical AND by the AND gates 172a to 172n. Therefore, only the AND gates (in the present embodiment, the AND gate $172_{n-3}$ (not shown) and the AND gate 172n) corresponding to the positions of the defect pulses P1 and P2 of the defect detection pulse 16 pass therethrough the defect pulses P1 and P2. As a result, only the flip flop $173_{n-3}$ (not shown) and the flip flop 173n corresponding to the AND gates $172_{n-3}$ and 172n are set as shown by the pulses $174_{n-3}$ and 174n of FIG. 6. That is, the positions of the defective portions D1 and D2 in the VFO portion 231 are stored in the flip flops 173a to 173n.

On the other hand, the microprocessor 110 receives the defect detection signal 16 to be informed of the presence of the defective portions in the regenerative clock signal 1a. Then, the microprocessor 110 judges whether or not the data of the sector of interest is properly decoded in the window for basic reproduction W of the pulse 26 of FIG. 6 (because even if the defective portion is present, the data may be decoded properly in some cases). If not, i.e., the decoder 6 generates an error signal, the microprocessor 110 instructs the reproducing circuit 170 and the retry controller 21 to perform the retry of the data of the sector of interest.

During the retry, in response to a retry instruction signal 22 from the microprocessor 110, the retry controller 21 turns an output 25, which is normally off, on. When detecting the leader of the sector, which failed to be decoded, from the incoming regenerative signal 1, the sector leader detecting circuit 331 in the timing generator 23 outputs a count start pulse 61 shown in FIG. 7. The counter 332 receives the count start pulse 61 to start counting the system clock designated by numeral 62 of FIG. 7.

When the count value of the counter 332 reaches a predetermined value, the waveform W of the pulse 26 of FIG. 6 is inputted from the circuit for producing a window for basic reproduction 191 to the multi-input AND gate 193. The set outputs of the flip flops $173_{n-3}$ and 173n which are storing the position information of the defective portions are also inputted to the multi-input AND gate 193 through the gate $193_{n-3}$ (not shown) and the gate 193n.

Figure 7:
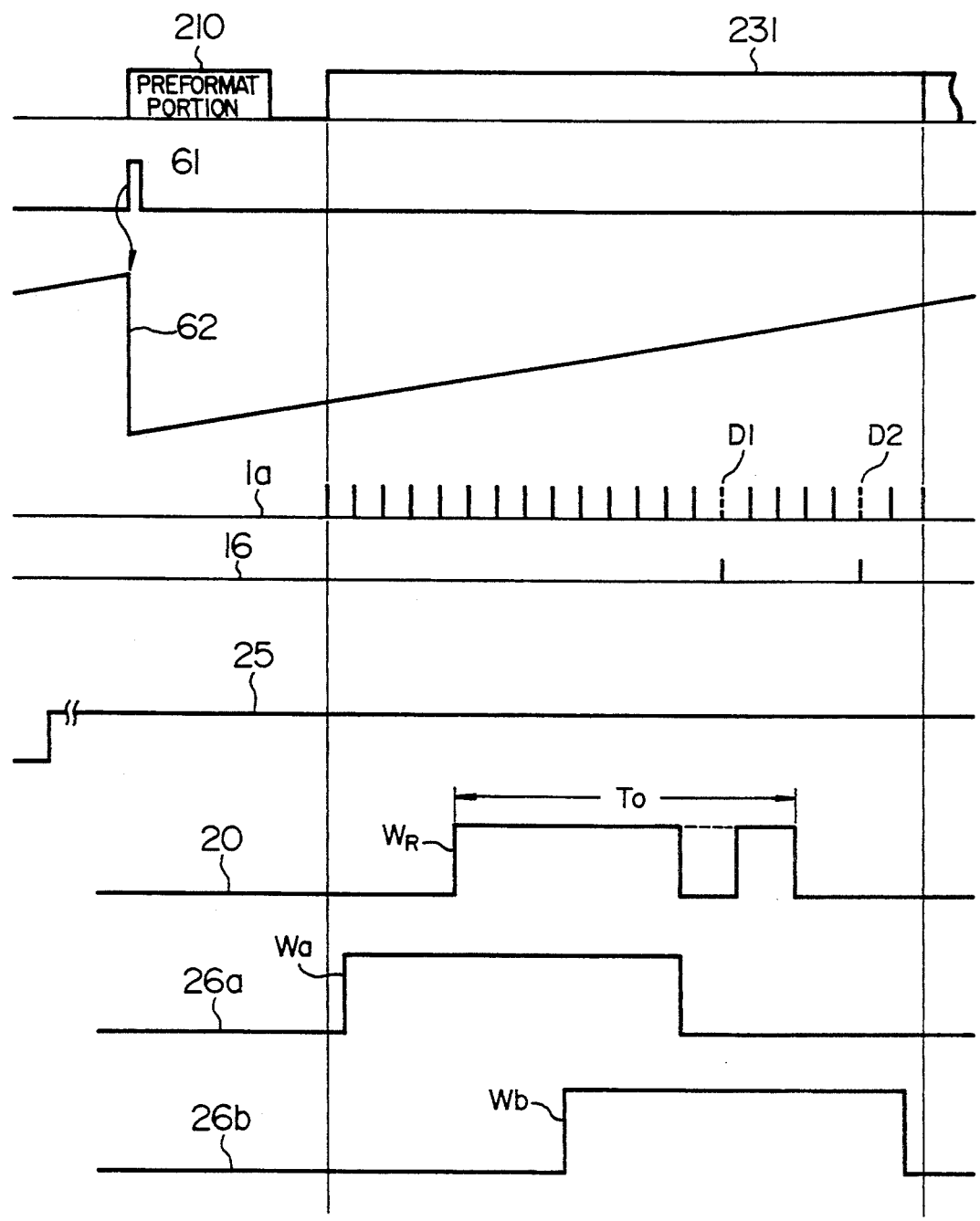
FIG. 7 is a timing chart showing waveforms occurring in a retry operation according to in the embodiment shown in FIG. 4.

As a result, the output of the AND gate 193 has the waveform having a window $W_R$ of the pulse 20 of FIG. 7. That is, in the retry, the PLL circuit 2 fetches only the non-defective portions of the regenerative clock signal in the window for basic reproduction W of the VFO portion 231 with the wide band and the high gain, and the PLL circuit 2 fetches the defective portion weakly with the low loop gain. Therefore, it is possible to improve a success rate of the data reproduction.

Figure 8:
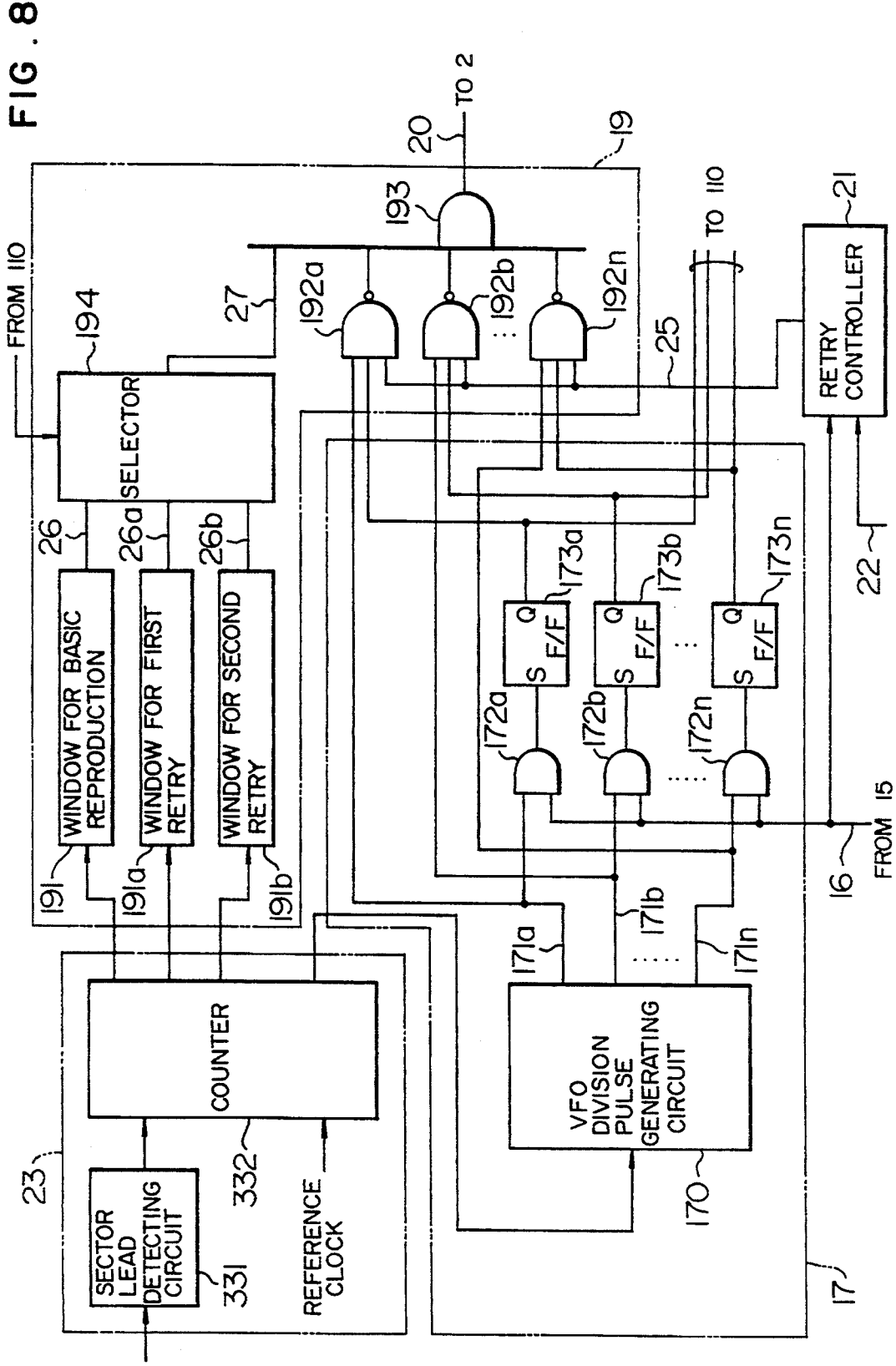
FIG. 8 is a block diagram showing a configuration of a main portion of another embodiment of the present invention.

FIG. 8 is a block diagram showing a configuration of another embodiment of the present invention. The present embodiment is characterized in that a circuit for producing a window for basic reproduction 191, a circuit for producing a window for first retry 191a, a circuit for producing a window for second retry 191b, and a selector 194 connected to the microprocessor 110 are provided, and that the outputs of the flip flops 173a to 173n are connected to the microprocessor 110. Other configurations are the same as those of FIG. 5. On the basis of the count value, the producing circuit 191 outputs the window W of the pulse 26 of FIG. 6, and the producing circuits 191a and 191b output windows Wa and Wb of the pulses 26a and 26b of FIG. 7, respectively.

When the decoder 6 generates the error signal, the microprocessor 110 instructs the reproducing circuit 170 and the retry controller 21 to retry the reproduction of the data of the sector of interest. At the same time, the microprocessor 110 reads out the output values of the flip flops 173a to 173n to examine closely the positions of the defective portions. In correspondence to the examination result, the microprocessor 110 controls the selector 194 to select the most suitable window out of the windows W, Wa and Wb to send the window thus selected to the AND gate 193. As a result, the function, of the PLL circuit 2, of switching the loop gain to the low gain in the defective portion is held, and in addition thereto, in order to select the VFO portion having fewer defective portions, the window for retry can be moved with respect to the time base.

Figure 9:
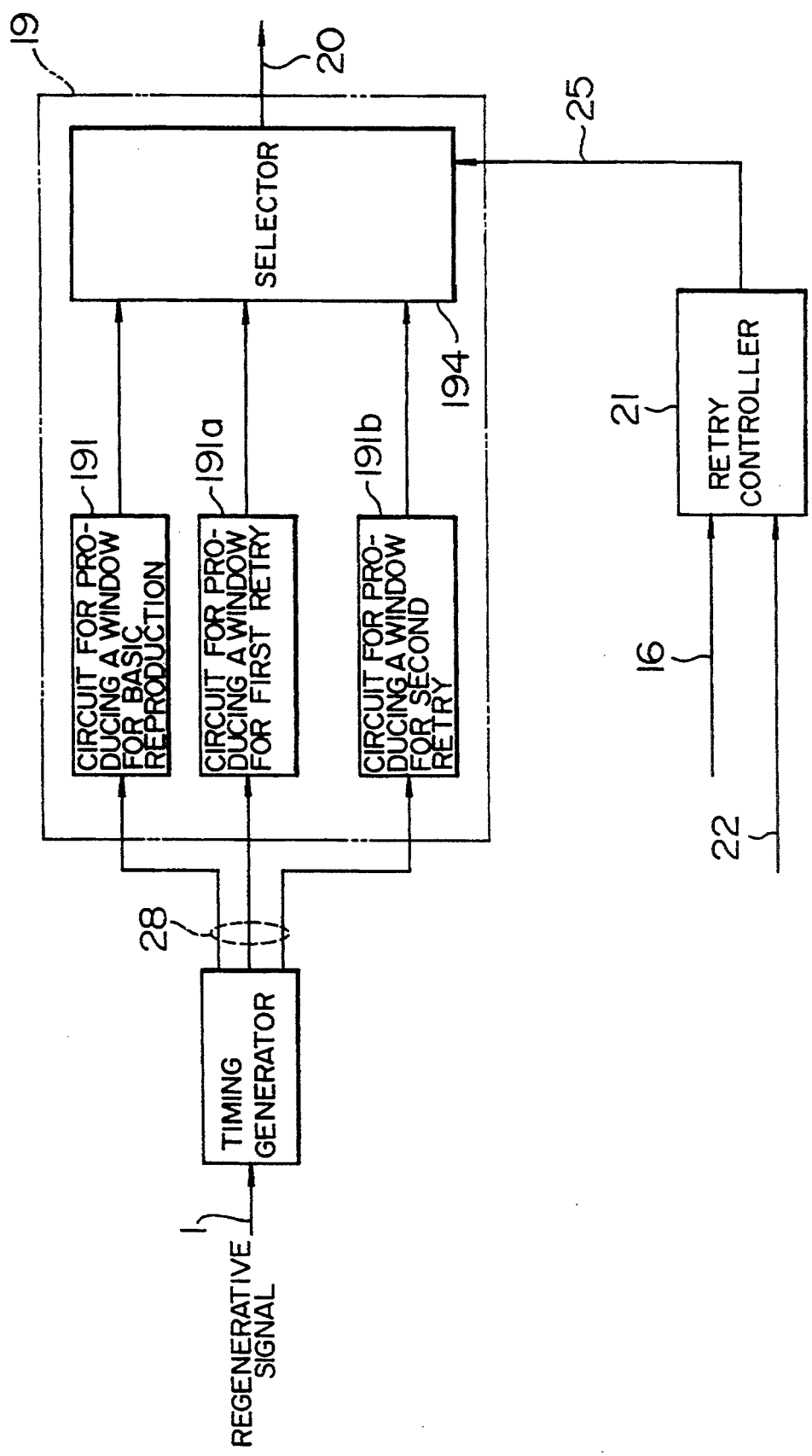
FIG. 9 is a block diagram showing a configuration of a main portion of still another embodiment of the present invention.

FIG. 9 is a block diagram showing a configuration of still another embodiment of the present invention. According to the present embodiment, the window for retry can be moved with respect to the time base by a simple configuration.

In the figure, the present embodiment is characterized in that the defect position discriminator 17 of FIG. 4 is removed, and the PLL controller 19 of FIG. 4 is made up of the circuit for producing a window for basic reproduction 191, the circuit for producing a window for first retry 191a, the circuit for producing a window for second retry 191b, and the selector 194, and that the selector 194 is connected to the retry controller 21.

When the decoder 6 generates the error signal, the microprocessor 110 instructs the reproducing circuit 170 and the retry controller 21 to retry the reproduction of the data of the sector of interest. The retry controller 21 controls the selector 194 using the retry control signal 25 to select the windows W, Wa and Wb in predetermined order. For example, in the first retry, the window Wa of the pulse 26a of FIG. 7 is selected. Then, in the case where the decoder 6 still generates the error signal, in the second retry, the window Wb of the pulse 26b of FIG. 7 is selected. By repeating such operations, the VFO portion having good reproducing conditions is selected.

In the above-mentioned embodiments, the description has been given by taking the magneto-optic disc unit to which the present invention is applied as an example. However, it should be noted that the data reproducing apparatus of the present invention can be applied similarly to an optical disc unit, a magnetic disc unit, an optical card reading unit or a magnetic card reading unit.

We claim:

1. A data reproducing apparatus for reproducing data from a regenerative signal read out from a recording medium for each unit area, comprising:
    a phase locked loop (PLL) circuit for receiving the regenerative signal to produce a synchronous signal synchronous with a regenerative clock signal included in a Variable Frequency Oscillator (VFO) portion having a predetermined duration in the respective signal;
    PLL control means connected to said PLL circuit for changing a loop gain of said PLL circuit, so that said PLL circuit generates a predetermined duration of a high loop gain in receiving the VFO portion; and
    defect detecting means for receiving the regenerative signal to detect the presence of a defective portion of the regenerative clock signal included in the VFO portion of the regenerative signal;
    wherein said PLL control means shifts the high loop gain duration of said PLL circuit within the duration of the VFO portion during the retry at which data in the same unit area are reproduced again from said recording medium in response to the detection of the defective portion.

2. An apparatus according to claim 1, wherein said PLL control means includes:
    means for generating a plurality of high loop gain durations of a same time width, of which starting timings are different from one another, for said PLL circuit; and
    selector means connected to said means for generating a plurality of high loop gain durations for selecting one of the high loop gain durations.

3. A data reproducing apparatus for reproducing data from a regenerative signal read out from a recording medium every unit area comprising:
    a phase locked loop (PLL) circuit for receiving the regenerative signal to produce a synchronous signal synchronous with a regenerative clock signal included in a Variable Frequency Oscillator (VFO) portion in the regenerative signal;
    timing generating means for receiving the regenerative signal to generate a timing signal capable of specifying a position in the VFO portion;
    PLL control means connected to said PLL circuit for changing a loop gain of said PLL circuit, so that said PLL circuit generates a predetermined duration of a high loop gain in receiving the VFO portion;
    defect detecting means for receiving the regenerative signal to detect the presence of a defective portion of the regenerative clock signal included in the VFO portion of the regenerative signal; and
    means connected to said timing generating means, said defect detecting means and said PLL control means for discriminating a position of the defective portion in the VFO portion;
    wherein said PLL control means makes a loop gain of said PLL circuit low in the position of the defective portion in the high loop gain duration of said PLL circuit during the retry at which data in the same unit area are reproduced again from said recording medium in response to the detection of the defective portion.

4. An apparatus according to claim 3, wherein said timing generating means comprises:
    means for detecting a leader of a unit area of the regenerative signal; and
    a counter connected to said leader detecting means for starting counting a reference clock from the leader of the unit area.

5. A data reproducing apparatus for reproducing data from a regenerative signal read out from a recording medium every unit area, comprising:
    a phase locked loop (PLL) circuit for receiving the regenerative signal to produce a synchronous signal synchronous with a regenerative clock signal included in a Variable Frequency Oscillator (VFO) portion in the regenerative signal;
    timing generating means for receiving the regenerative signal to generate a timing signal capable of specifying a position in the VFO portion;
    PLL control means connected to said PLL circuit for changing a loop gain of said PLL circuit, So that said PLL circuit generates a predetermined duration of a high loop gain in receiving the VFO potion;
    decoding means connected to said PLL circuit for decoding data from the regenerative signal synchronistically with the synchronous signal;
    defect detecting means for receiving the regenerative signal to detect the presence of a defective portion of the regenerative clock signal included in the VFO portion of the regenerative signal; and
    means connected to said timing generating means, said defect detecting means and said PLL control means for discriminating a position of the defective portion in the VFO portion;
    wherein said PLL control means makes a loop gain of said PLL circuit low in the position of the defective portion in the high loop gain duration of said PLL circuit during retry at which data in the same unit area are reproduced again from said recording medium in response to a defect detection signal from said defect detecting means and a decode error signal from said decoding means.

6. An apparatus according to claim 5, wherein said timing generating means comprises:
   means for detecting a leader of a unit area of the regenerative signal; and
   a counter connected to said leader detecting means for starting counting a reference clock from the leader of the unit area.

7. A data reproducing apparatus for reproducing data from a regenerative signal read out from a recording medium every unit area, comprising:
   a phase locked loop (PLL) circuit for receiving the regenerative signal to produce a synchronous signal synchronous with a regenerative clock signal included in a Variable Frequency Oscillator (VFO) portion in the regenerative signal;
   timing generating means for receiving the regenerative signal to generate a timing signal capable of specifying a position in the VFO portion;
   PLL control means connected to said PLL circuit for changing a loop gain of said PLL circuit, so that said PLL circuit generates a predetermined duration of a high loop gain in receiving the VFO portion;
   defect detecting means for receiving the regenerative signal to detect the presence of a defective portion of the regenerative clock signal included in the VFO portion of the regenerative signal; and
   means connected to said timing generating means, said defect detecting means and said PLL control means for discriminating a position of the defective portion in the VFO portion;
   wherein said said PLL control means shifts the high loop gain duration of said PLL circuit within the VFO portion by taking the position of the defective portion obtained by said position discriminating means into consideration during retry at which data in the same unit area are reproduced again from said recording medium in response to a defect detection signal from said defect detecting means, and
   said PLL control means makes a loop gain of said PLL circuit low in the position of the defective portion in high loop gain duration of said PLL circuit.

8. An apparatus according to claim 7, wherein said timing generating means comprises:
   means for detecting a leader of a unit area of the regenerative signal; and
   a counter connected to said leader detecting means for starting counting a reference clock from the leader of the unit area.

9. An apparatus according to claim 7, wherein said PLL control means includes:
   means for generating a plurality of high loop gain areas, of which timings are different from one another, to said PLL circuit; and
   selector means connected to said means for generating a plurality of high loop gain areas and said instruction means, for selecting one of the high loop gain areas, in response to an instruction from said instruction means.

10. A method of producing data employing a Phase locked loop (PLL) circuit, said PLL circuit producing a synchronous signal synchronous with a regenerative clock signal included in a Variable Frequency Oscillator (VFO) portion having a predetermined duration in a regenerative signal read out from a recording medium, comprising the steps of:
    receiving a regenerative signal read out from said recording medium for each unit area;
    detecting the presence of a defective portion of the regenerative clock signal included in the VFO portion in the regenerative signal;
    storing a position of the defective portion in the VFO portion;
    requesting retry for reproducing again data in the same unit area from said recording medium; and
    shifting a high loop gain duration of said PLL circuit within the duration of the VFO portion during the retry.

11. A method of producing data employing a Phase locked loop (PLL) circuit, said PLL circuit producing a synchronous signal synchronous with a regenerative clock signal included in a Variable Frequency Oscillator (VFO) portion having a predetermined duration in a regenerative signal read out from a recording medium, comprising the steps of:
    receiving a regenerative signal read out from said recording medium for each unit area;
    detecting the presence of a defective portion of the regenerative clock signal included in the VFO portion in the regenerative signal;
    storing a position of the defective portion in the VFO portion;
    requesting retry for reproducing again data in the same unit area from said recording medium; and
    making a loop gain of said PLL circuit low for a predetermined time covering the position of the defective portion in a high loop gain duration of said PLL circuit during the retry.

12. A data reproducing apparatus for reproducing data from a regenerative signal read out from a recording medium on a unit area basis, comprising:
    a Phase locked loop (PLL) circuit for receiving the regenerative signal to produce a synchronous signal in synchronism with a regenerative clock signal included in a Variable Frequency Oscillator (VFO) portion having a predetermined duration in the regenerative signal;
    a discriminator connected to said PLL circuit, for extracting a detection signal from said regenerative signal in synchronism with the regenerative clock signal;
    a decoder connected to said discriminator, for decoding the detection signal to produce a decoded signal, said decoder generating a decode error signal when decoding operation has failed; and
    PLL control means connected to said PLL circuit, for changing a loop gain of said PLL circuit;
    wherein said PLL control means makes a loop gain of said PLL circuit low throughout retry at which data in the same unit area are reproduced again from said recording medium in response to the decide error signal, so that a synchronizing effect of said PLL circuit on the regenerative clock signal may be reduced to avoid an influence of a defective portion on the regenerative clock signal due to a high loop gain of said PLL circuit.

13. A data reproducing apparatus for reproducing data from a regenerative signal read out from a recording medium for each unit area, comprising:

a Phase locked loop (PLL) circuit for receiving the regenerative signal to produce a synchronous signal synchronous with a regenerative clock signal included in Variable Frequency Oscillator (VFO) portion having a predetermined duration in the respective signal;

a PLL controller connected to said PLL circuit for changing a loop gain of said PLL circuit, so that said PLL circuit generates a predetermined duration of a high loop gain in receiving the VFO portion; and a defect detector for receiving the regenerative signal to detect the presence of a defective portion of the regenerative clock signal included in the VFO portion of the regenerative signal, wherein said PLL controller shifts the high loop gain duration of said PLL circuit within the duration of the VFO portion during retry at which data in the same unit area are reproduced again from said recording medium in response to the detection of the defective portion.

14. A data reproducing apparatus for reproducing data from a regenerative signal read out from a recording medium every unit area, comprising:

a Phase locked loop (PLL) circuit for receiving the regenerative signal to produce a synchronous signal synchronous with a regenerative clock signal included in a Variable Frequency Oscillator (VFO) portion in the regenerative signal;

a timing generator for receiving the regenerative signal to generate a timing signal capable of specifying a position in the VFO portion;

a PLL controller connected to said PLL circuit for changing a loop gain of said PLL circuit, so that said PLL circuit generates a predetermined duration of a high loop gain in receiving the VFO portion;

a defect detector for receiving the regenerative signal to detect the presence of a defective portion of the regenerative clock signal included in the VFO portion of the regenerative signal; and a discriminator connected to said timing generator, said defect detector and said PLL controller for discriminating a portion of the defective portion in the VFO portion;

wherein said PLL controller makes a loop gain of said PLL circuit low in the position of the defective portion in the high loop gain duration of said PLL circuit during retry at which data in the same unit area are reproduced again from said recording medium in response to the detection of the defective portion.

15. A data reproducing apparatus for reproducing data from a regenerative signal read out from a recording medium every unit area, comprising:

a Phase locked loop (PLL) circuit for receiving the regenerative signal to produce a synchronous signal synchronous with a regenerative clock signal included in a Variable Frequency Oscillator (VFO) portion in the regenerative signal;

a timing generator for receiving the regenerative signal to generate a timing signal capable of specifying a position in the VFO portion;

a PLL controller connected to said PLL circuit for changing a loop gain of said PLL circuit, so that said PLL circuit generates a predetermined duration of a high loop gain in receiving the VFO portion;

a decoder connected to said PLL circuit for decoding data from the regenerative signal synchronistically with the synchronous signal;

a defect detector for receiving the regenerative signal to detect the presence of a defective portion of the regenerative clock signal included in the VFO portion of the regenerative signal; and a discriminator connected to said timing generator, said defect detector and said PLL controller for discriminating a position of the defective portion in the VFO portion;

wherein said PLL controller makes a loop gain of said PLL circuit low in the position of the defective portion in the high loop gain duration of said PLL circuit during retry at which data in the same unit area are reproduced again from said recording medium in response to a defect detection signal from said defect detector and a decode error signal from said decoder.

16. A data reproducing apparatus for reproducing data from a regenerative signal read out from a recording medium every unit area, comprising:

a Phase locked loop (PLL) circuit for receiving the regenerative signal to produce a synchronous signal synchronous with a regenerative clock signal included in a Variable Frequency Oscillator (VFO) portion in the regenerative signal;

a timing generator for receiving the regenerative signal to generate a timing signal capable of specifying a position in the VFO portion;

a PLL controller connected to said PLL circuit for changing a loop gain of said PLL circuit, so that said PLL circuit generates a predetermined duration of a high loop gain in receiving the VFO portion;

a defect detector for receiving the regenerative signal to detect the presence of a defective portion of the regenerative clock signal included in the VFO portion of the regenerative signal; and a discriminator connected to said timing generator, said defect detector and said PLL controller for discriminating a position of the defective portion in the VFO portion, wherein said PLL controller shifts the high loop gain duration of said PLL circuit within the VFO portion by taking the position of the defective portion obtained by said discriminator into consideration during retry at which data in the same unit area are reproduced again from said recording medium in response to a defect detection signal from said defect detector, and said PLL controller makes a loop gain of said PLL circuit low in the position of the defective portion in the high loop gain duration of said PLL circuit.

17. A data reproducing apparatus for reproducing data from a regenerative signal read out from a recording medium on a unit area basis comprising:

a Phase locked loop (PLL) circuit for receiving the regenerative signal to produce a synchronous signal in synchronism with a regenerative clock signal included in a Variable Frequency Oscillator (VFO) portion having a predetermined duration in the regenerative signal;

a discriminator connected to said PLL circuit, for extracting a detection signal from said regenerative signal in synchronism with the regenerative clock signal;

a decoder connected to said discriminator, for decoding the detection signal to produce a decoded signal, said decoder generating a decode error signal when decoding operation has failed; and a PLL controller connected to said PLL circuit, for changing a loop gain of said PLL circuit;

wherein said PLL controller makes a loop gain of said PLL circuit low throughout retry at which data in the same unit area are reproduced again from said recording medium in response to the decode error signal, so that a synchronizing effect of said PLL circuit on the regenerative clock signal may be reduced to avoid an influence of a defective portion on the regenerative clock signal due to a high loop gain of said PLL circuit.

* * * * *

UNITED STATES PATENT AND TRADEMARK OFFICE
CERTIFICATE OF CORRECTION

PATENT NO. : 5,448,543
DATED : September 5, 1995
INVENTOR(S) : T. MIZOKAMI et al It is certified that error appears in the above-indentified patent and that said Letters Patent is hereby corrected as shown below:

On the title page item [73],

Add assignee --HITACHI VIDEO & INFORMATION SYSTEM, INC. Kanagawa-ken, JAPAN--.

Signed and Sealed this

Twenty-eighth Day of May, 1996

Attest:

BRUCE LEHMAN

*Attesting Officer*  *Commissioner of Patents and Trademarks*